(No Model.)  
4 Sheets—Sheet 1.

A. WEBER.
LIMEKILN.

No. 355,043. Patented Dec. 28, 1886.

WITNESSES:  
INVENTOR  
Adam Weber  
ATTORNEYS.

(No Model.) 4 Sheets—Sheet 4.

A. WEBER.
LIMEKILN.

No. 355,043. Patented Dec. 28, 1886.

WITNESSES:
A. Schehl.
Carl Karp

INVENTOR
Adam Weber
BY
Goepel Raegener
ATTORNEYS.

UNITED STATES PATENT OFFICE.

ADAM WEBER, OF NEW YORK, N. Y.

LIMEKILN.

SPECIFICATION forming part of Letters Patent No. 355,043, dated December 28, 1886.

Application filed June 3, 1886. Serial No. 203,973. (No model.)

*To all whom it may concern:*

Be it known that I, ADAM WEBER, of the city, county, and State of New York, have invented certain new and useful Improvements in Limekilns, of which the following is a specification.

This invention has reference to an improved kiln for reburning the spent lime of gas-works, which is so constructed that the sulphurous and other obnoxious vapors driven out in burning the spent lime are conducted off and neutralized, so as not to contaminate the air near said works; and the invention consists of a kiln for reburning or revivifying the spent lime of gas-works, which kiln is composed of a number of chambers or compartments that are adapted to be separately heated, and are connected by flues in the side walls, and an exhausting apparatus, with a condenser in which the sulphurous vapors that are driven out of the spent lime are neutralized and prevented from passing off to the atmosphere. Each chamber of the kiln is provided with separate fire-places at diagonally-opposite ends, and with auxiliary openings in the side walls, within which hydrocarbon-injectors are located that are connected by pipes with oil and steam pipes, said hydrocarbon-injectors being used for raising the charge in the chamber of the kiln to a higher temperature than that produced by the furnace, so that the reburning of the charge can be accomplished in a quick and effective manner.

Figure 1:
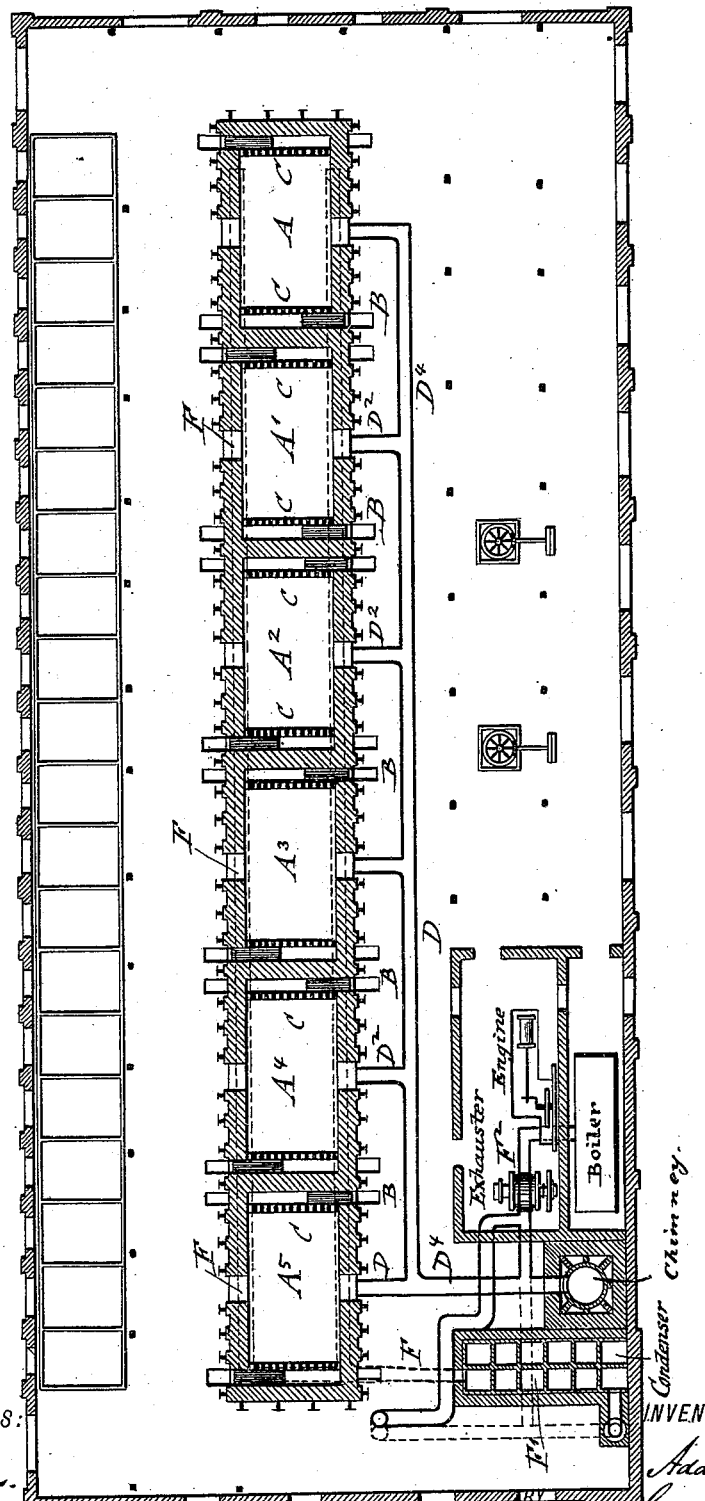
Figure 2:
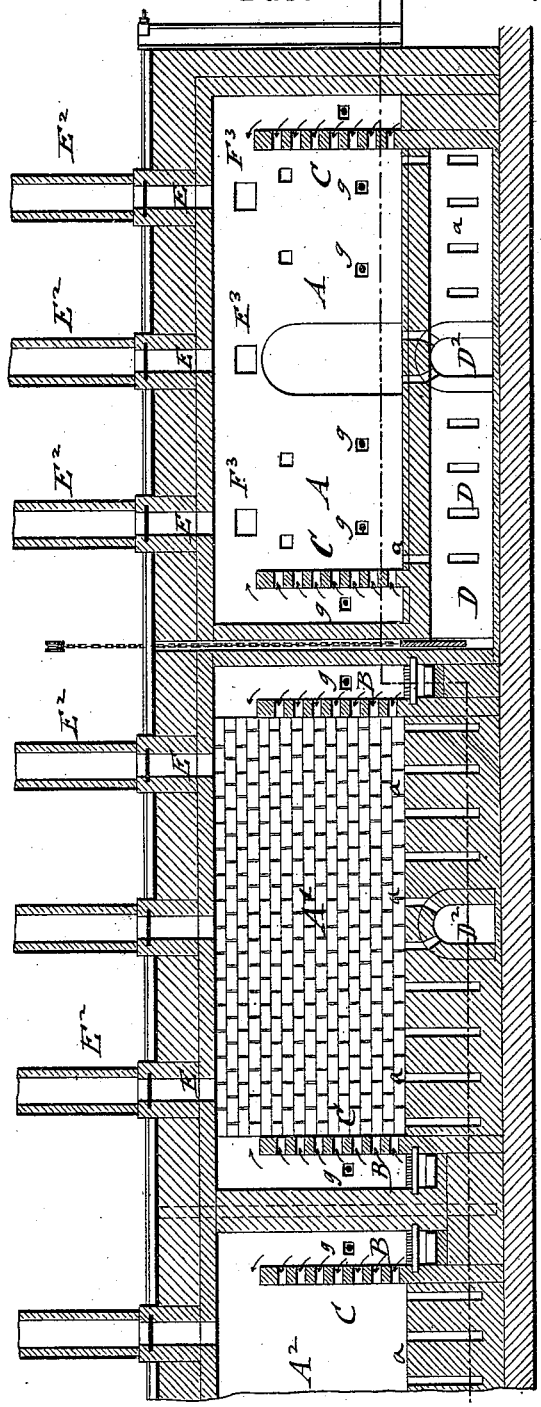
Figure 3:
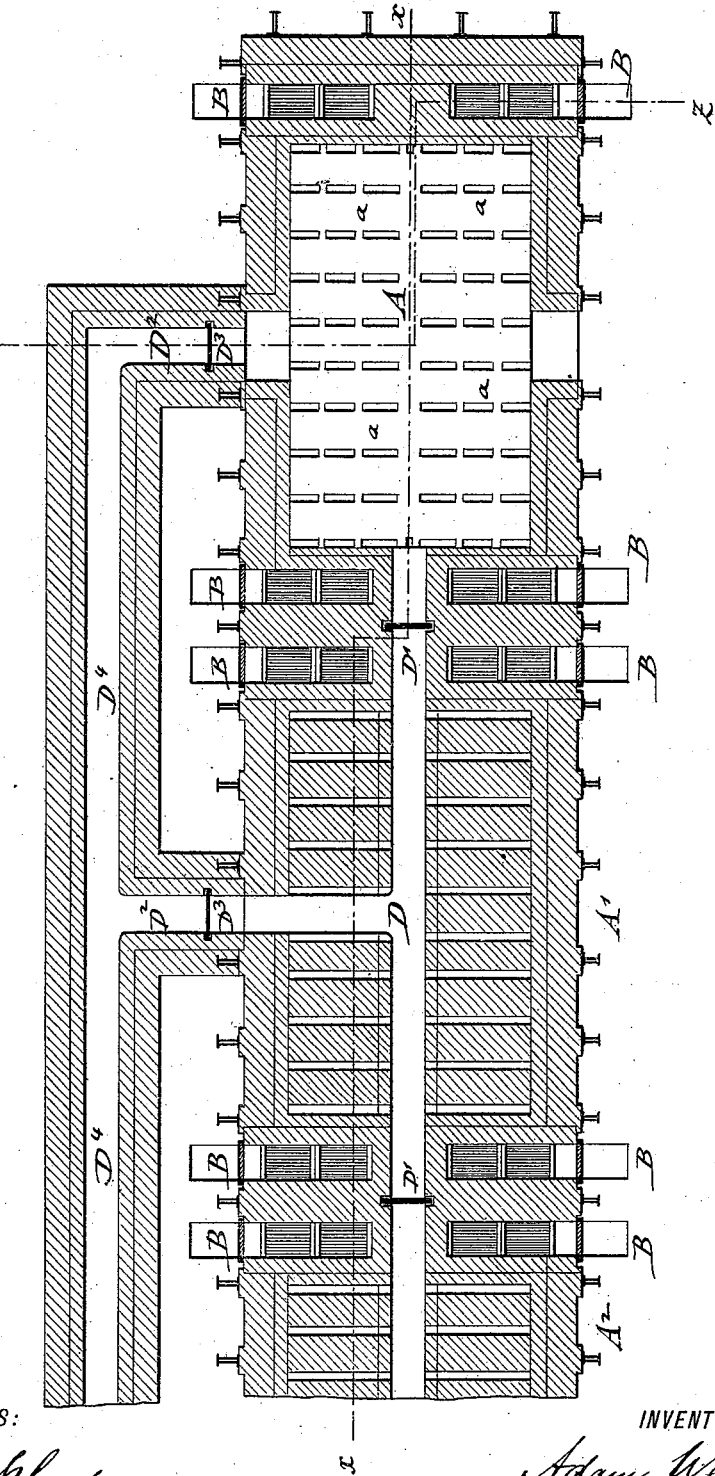
Figure 4:
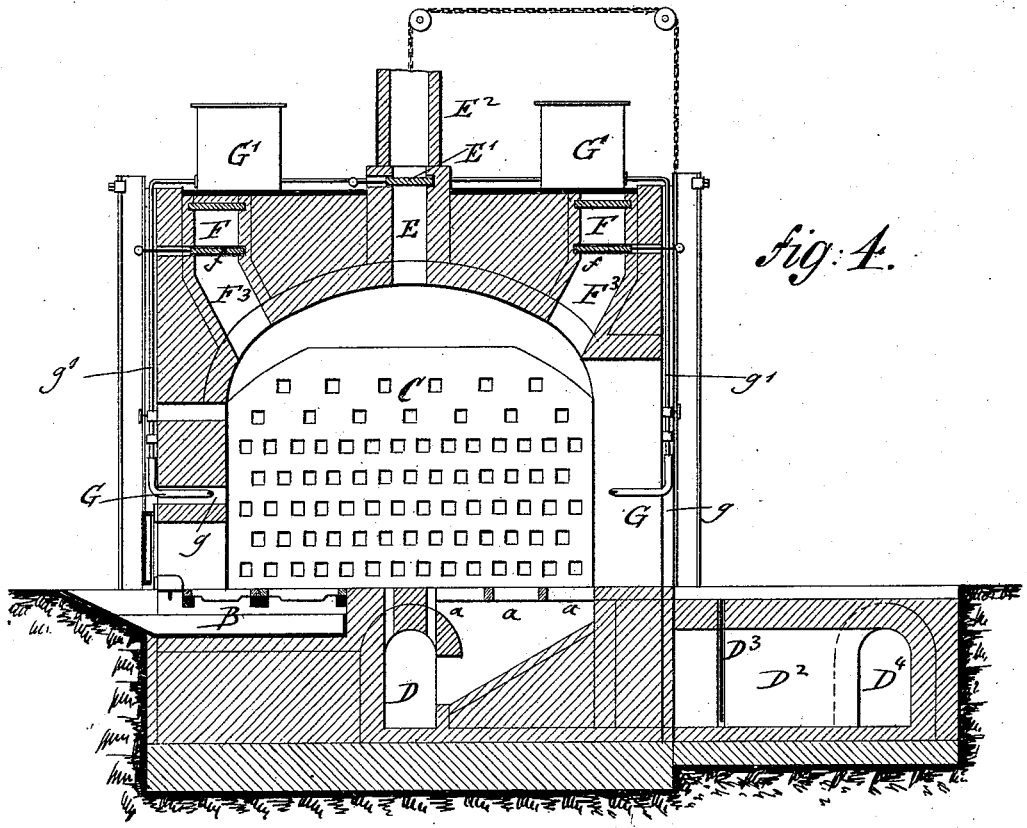
Figure 5:
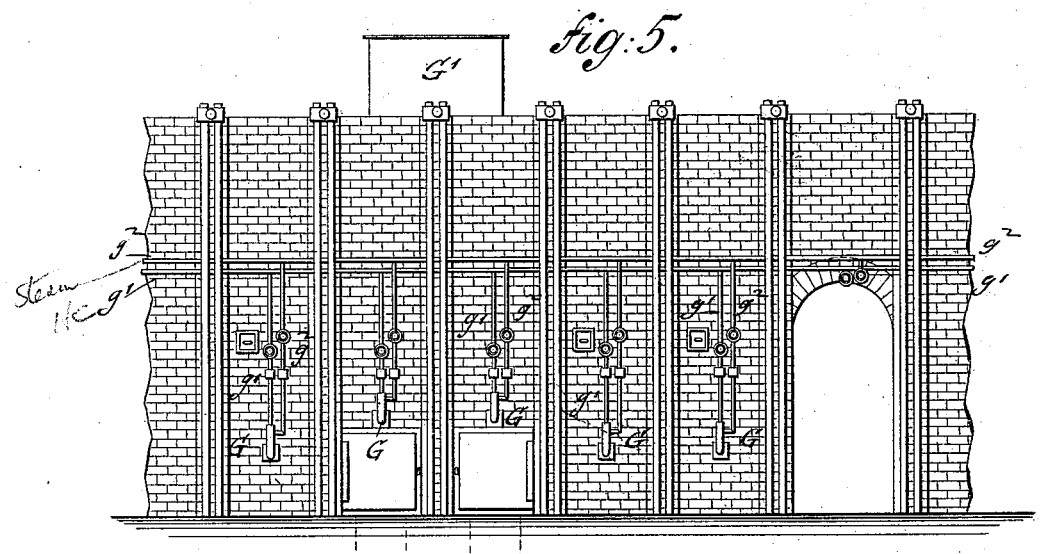

In the accompanying drawings, Figure 1 represents a horizontal section and plan of my improved kiln for reburning the spent lime of gas-works, the kiln shown being composed of six chambers or compartments, which are connected with each other and charged successively, so that the kiln can be kept in continuous operation. Fig. 2 is a vertical longitudinal section on line $x\, x$, Fig. 3, of two chambers of the kiln, one charged and the other ready to receive a charge. Fig. 3 is a horizontal section on line $y\, y$, Fig. 2. Fig. 4 is a vertical transverse section on line $z\, z$, Fig. 3, drawn on a larger scale; and Fig. 5 is a side elevation of the kiln.

Similar letters of reference indicate corresponding parts.

In the drawings, A A' to $A^5$ are the different chambers of my improved kiln for reburning or revivifying the spent lime of gas-works. Any suitable number of compartments may be arranged, according to the quantity of the lime that is to be reburned. Each chamber of the kiln is provided at two diagonally-opposite corners with furnaces B, that are separated from the end walls of the kiln by vertical transverse bridge-walls C, of fire-brick, which are provided with openings or flues for the passage of the fire-gases. The space in each compartment between the vertical bridge-walls C is filled with a charge of spent lime that has been formed into the shape of bricks by the usual appliances for being more easily handled, and for permitting the burning of the bricks in such a manner that the fire-gases will readily pass around the same in the kiln.

Different pug-machines, brick-forming machines, and endless conveying-belts are arranged in the space at one side of the kiln, so as to be within convenient reach of the chambers of the kiln for permitting the quick and effective charging of the same. The bottom of each chamber is provided with openings $a\, a$, through which the gas can be drawn off into a central longitudinal channel, D, that is arranged below the bottom of the chambers, and provided with dampers D' at each main partition-wall of the kiln, so that two adjoining chambers can be readily placed in communication with each other for utilizing the surplus heat of one chamber for drying the charge in the next adjoining chamber and for driving off the sulphur in the same. The central channel, D, is further connected by short lateral flues $D^2$, having dampers $D^3$, and a longitudinal connecting-flue, $D^4$, with a chimney for producing the required draft for the products of combustion. The arched top of each chamber is provided with vertical center flues, E, having dampers E', and short chimneys $E^2$, which flues and chimneys serve for accelerating the cooling of the charge after the same has been burned.

The parts so far described have been used heretofore, and I consequently make no claim to the same. The new feature of my kiln consists of the arrangement of the longitudinal flues F, that extend in both side walls near the top of the kiln to a condensing apparatus, F', to which an exhauster, $F^2$, is connected. The longitudinal flues F are connected with the arched top part of the chambers by vertical flues $F^3$, and placed by means of dampers $f'$ in communication with the same, as required. The longitudinal flues F serve for the purpose of conveying the sulphurous and other obnoxious vapors that are contained in the lime bricks and driven off by the fierce heat applied to the same from the chambers to the condenser $F'$. The exhauster $F^2$ draws off these vapors continuously from the chambers and conducts them to the condenser, where they are neutralized, and finally passed through the furnace of the boiler, so as not to escape into the atmosphere and contaminate the same. The limekiln can therefore be worked in connection with any gas-works without complaint from the neighborhood, as full and effective provision is made for the proper condensation and neutralization of the sulphurous and other vapors contained in the spent-lime bricks. Each charge of spent-lime bricks is exposed to two different heats—first, to the furnace heat, which is sufficient to drive off the sulphurous vapors contained therein; secondly, to the heat of a number of hydrocarbon-injectors, G, which are arranged in openings $g$ of the main side walls of the kiln, and connected by pipes $g'$, having stop-cocks, with hydrocarbon-supply tanks $G'$, and by steam-pipes $g^2$ with the boiler.

The hydrocarbon injectors G may be of any approved construction. They are thrown into operation when the charge is sufficiently advanced to be exposed to the highest heat, by which the spent lime is changed into burned or caustic lime. The high temperature that is obtained by the burning of the hydrocarbon vapors and steam emitted by the hydrocarbon-injectors completes the revivifying process in a very short time as compared to the slow method of burning the bricks in kilns with furnaces only, which kilns do not permit the concentration of the heat and the quick raising of the temperature in the chamber, so that the quick and effective burning of the lime takes place. The gases of combustion are drawn through the bottom openings of one chamber or compartment into the next adjoining one which has been charged with fresh bricks, said gases ascending in the latter chamber, so as to dry the charge, the moisture and vapors being permitted to pass out through the short top chimneys. When the moisture is driven off, the furnaces are started and the bricks passed through the first stage—namely, that of driving off the sulphurous and other gases. When this is accomplished, the hydrocarbon-injectors are started and the charge is exposed to the final stage—that of reburning or revivifying the lime.

The advantages of my improved limekiln are, that the same can be continuously operated by the successive charging of the different chambers or compartments; secondly, that the surplus heat in the compartments can be utilized for drying the charge in one of the adjoining compartments and driving off a part of the sulphur; thirdly, that by the arrangement of the hydrocarbon-injectors the reburning of the lime is accomplished in about one-half the time than in the kilns heretofore in use, and, lastly, that the sulphurous vapors are condensed and rendered innocuous, so that the atmosphere is not contaminated and the gas-works rendered objectionable to the neighborhood.

Having thus described my invention, I claim as new and desire to secure by Letters Patent—

1. The combination, in a kiln for reburning the spent lime of gas-works, of one or more chambers or compartments having the usual fire-places and transverse bridge-walls, longitudinal top flues connected with said chambers, a condenser connected with said top flues, and an exhauster connected with the condenser, substantially as shown and described.

2. In a kiln for reburning the spent lime of gas-works, the combination of one or more chambers or compartments having the usual fire-places and transverse bridge-walls, hydrocarbon-injectors located in openings of the side walls, longitudinal top channels connected with said chambers, a condenser connected with said top flues, and an exhauster connected with the condenser, whereby the sulphurous vapors driven off are conducted off and neutralized, substantially as set forth.

3. The process herein described of reburning or revivifying the spent lime of gas-works, which consists in subjecting the charge of spent lime to a temperature at which the sulphurous and other gases are driven off, and then quickly raising the temperature to the degree required for reburning the charge, whereby the reburning operation is accomplished in a shorter time, substantially as set forth.

4. The process herein described of reburning or revivifying the spent lime of gas-works, which consists in subjecting the charge of spent lime to a temperature at which the sulphurous and other gases are driven off, next driving off and neutralizing said gases, and quickly raising the temperature to such a degree that the burning of the lime in the kiln is quickly accomplished, substantially as set forth.

In testimony that I claim the foregoing as my invention I have signed my name in presence of two subscribing witnesses.

ADAM WEBER.

Witnesses:
PAUL GOEPEL,
MARTIN PETRY.